United States Patent
Taguchi

(10) Patent No.: US 9,031,709 B2
(45) Date of Patent: May 12, 2015

(54) VEHICLE TRAVEL CONTROL APPARATUS AND VEHICLE TRAVEL CONTROL METHOD

(75) Inventor: Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 911 days.

(21) Appl. No.: 12/779,469

(22) Filed: May 13, 2010

(65) Prior Publication Data

US 2010/0292888 A1    Nov. 18, 2010

(30) Foreign Application Priority Data

May 13, 2009  (JP) ................. 2009-116944

(51) Int. Cl.
| | |
|---|---|
| *G05D 1/00* | (2006.01) |
| *B60W 10/00* | (2006.01) |
| *B60K 28/16* | (2006.01) |
| *B60W 10/06* | (2006.01) |
| *B60W 10/11* | (2012.01) |
| *B60W 10/184* | (2012.01) |
| *B60W 10/20* | (2006.01) |
| *B60W 30/02* | (2012.01) |
| *B60W 30/18* | (2012.01) |
| *B60W 50/08* | (2012.01) |

(52) U.S. Cl.
CPC .............. *B60W 10/06* (2013.01); *B60W 10/11* (2013.01); *B60W 10/184* (2013.01); *B60W 10/20* (2013.01); *B60W 30/025* (2013.01); *B60W 30/18* (2013.01); *B60W 50/085* (2013.01); *B60W 2520/105* (2013.01); *B60W 2520/125* (2013.01); *B60W 2520/14* (2013.01); *B60W 2520/28* (2013.01); *B60W 2540/10* (2013.01); *B60W 2540/12* (2013.01); *B60W 2550/402* (2013.01); *B60W 2710/105* (2013.01); *B60W 2720/103* (2013.01)

(58) Field of Classification Search
None
See application file for complete search history.

(56) References Cited

U.S. PATENT DOCUMENTS

| | | | |
|---|---|---|---|
| 7,809,488 B2 | 10/2010 | Egawa et al. | |
| 2002/0056583 A1* | 5/2002 | Takano et al. | 180/197 |
| 2004/0144173 A1* | 7/2004 | Umeno et al. | 73/325 |
| 2009/0062068 A1* | 3/2009 | Nakai et al. | 477/92 |
| 2010/0191435 A1 | 7/2010 | Okamura et al. | |

FOREIGN PATENT DOCUMENTS

| | | |
|---|---|---|
| JP | 2006123604 A | 5/2006 |
| JP | 2007296915 A | 11/2007 |
| JP | 2009-029314 A | 2/2009 |

* cited by examiner

*Primary Examiner* — Ryan Zeender
*Assistant Examiner* — Denisse Ortiz Roman
(74) *Attorney, Agent, or Firm* — Gifford, Krass, Sprinkle, Anderson & Citkowski, P.C.

(57) ABSTRACT

A vehicle travel control apparatus that controls state of travel of a vehicle by adjusting force that acts on the vehicle includes: an acting force adjustment portion that adjusts the force that acts on the vehicle, according to the state of travel of the vehicle; an operating state detection portion that detects an operating state of an operation member that is operated to control the state of travel of the vehicle; and an adjustment degree alteration portion that alters degree of adjustment made by the acting force adjustment portion, according to the operating state of the operation member.

11 Claims, 7 Drawing Sheets

VEHICLE TRAVEL CONTROL APPARATUS AND VEHICLE TRAVEL CONTROL METHOD

INCORPORATION BY REFERENCE

The disclosure of Japanese Patent Application No. 2009-116944 filed on May 13, 2009 including the specification, drawings and abstract is incorporated herein by reference in its entirety.

BACKGROUND OF THE INVENTION

1. Field of the Invention

The invention relates to a vehicle travel control apparatus and a vehicle travel control method which generate a travel route that a vehicle is to take and generate a velocity pattern according to the travel route, and which control the traveling of the vehicle on the basis of the travel route and the velocity pattern.

2. Description of the Related Art

A vehicle travel control apparatus that generates a target velocity pattern for a travel route of a vehicle, and controls the traveling of the vehicle on the basis of the velocity pattern is described in, for example, Japanese Patent Application Publication No. 2007-296915 (JP-A-2007-296915). In the case of alerting a driver by giving a reaction force to the accelerator pedal under a predetermined condition, an inter-vehicle distance maintenance assist apparatus described in JP-A-2007-296915 induces the driver's operation of an accelerator pedal so as to achieve an accelerator operation amount that makes it easy for the driver to feel the reaction force of the accelerator pedal, by changing the relation between the accelerator operation amount and the drive torque into a correspondence relation therebetween that is different from an ordinary correspondence relation therebetween. In this manner, the inter-vehicle distance maintenance assist apparatus securely alerts the driver by giving a reaction force to the accelerator pedal.

In the inter-vehicle distance maintenance assist apparatus described in JP-A-2007-296915, the relation between the accelerator operation amount and the drive torque is changed so that the driver will easily feel the reaction force of the accelerator pedal, and therefore the driver can be alerted to the guidance of the accelerator operation. However, the provision of reaction force to the accelerator pedal for the purpose of guiding the driver's operation of the accelerator pedal sometimes does not match the driver's intention of the operation of the accelerator pedal. In such a case, the driver may feel discomfort, and drivability may deteriorate.

SUMMARY OF THE INVENTION

The invention provides a vehicle travel control apparatus and a vehicle travel control method that lessen the burden on a driver of a vehicle by performing a proper travel assist and improve drivability by performing an assist with less discomfort caused to the driver.

An vehicle travel control apparatus in accordance with a first aspect of the invention is a vehicle travel control apparatus that controls state of travel of a vehicle by adjusting force that acts on the vehicle, and includes: an acting force adjustment portion that adjusts the force that acts on the vehicle, according to the state of travel of the vehicle; an operating state detection portion that detects an operating state of an operation member that is operated to control the state of travel of the vehicle; and an adjustment degree alteration portion that alters degree of adjustment made by the acting force adjustment portion, according to the operating state of the operation member.

According to the first aspect, the vehicle travel control apparatus includes: the acting force adjustment portion that adjusts the force that acts on the vehicle, according to the state of travel of the vehicle; the operating state detection portion that detects the operating state of an operation member that a driver of the vehicle operates to control the state of travel of the vehicle; and the adjustment degree alteration portion that alters the degree of the adjustment made by the acting force adjustment portion, according to the operating state of the operation member. Therefore, the vehicle travel control apparatus is able to lessen the burden on the driver by performing a proper travel assist, and is also able to improve drivability by performing an assist with less discomfort caused to the driver.

A vehicle travel control apparatus in accordance with a second aspect of the invention is a vehicle travel control apparatus that controls state of travel of a vehicle by adjusting force that acts on the vehicle, and includes: acting force adjustment means for adjusting the force that acts on the vehicle, according to the state of travel of the vehicle; operating state detection means for detecting an operating state of an operation member that is operated to control the state of travel of the vehicle; and adjustment degree alteration means for altering degree of adjustment made by the acting force adjustment means, according to the operating state of the operation member.

The vehicle travel control apparatus in accordance with the second aspect is able to achieve substantially the same effects as the vehicle travel control apparatus in accordance with the first aspect.

A vehicle travel control method in accordance with a third aspect of the invention is a vehicle travel control method that controls state of travel of a vehicle by adjusting force that acts on the vehicle, and includes: adjusting the force that acts on the vehicle, according to the state of travel of the vehicle; detecting an operating state of an operation member that is operated to control the state of travel of the vehicle; and altering degree of adjustment of the force that acts on the vehicle, according to the operating state of the operation member.

The vehicle travel control method in accordance with the third aspect is able to achieve substantially the same effects as the vehicle travel control apparatus in accordance with the first aspect.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Hereinafter, embodiments of the vehicle travel control apparatus of the invention will be described in detail with reference to the drawings. Incidentally, it is to be noted that the following embodiments do not limit the invention.

Figure 1:
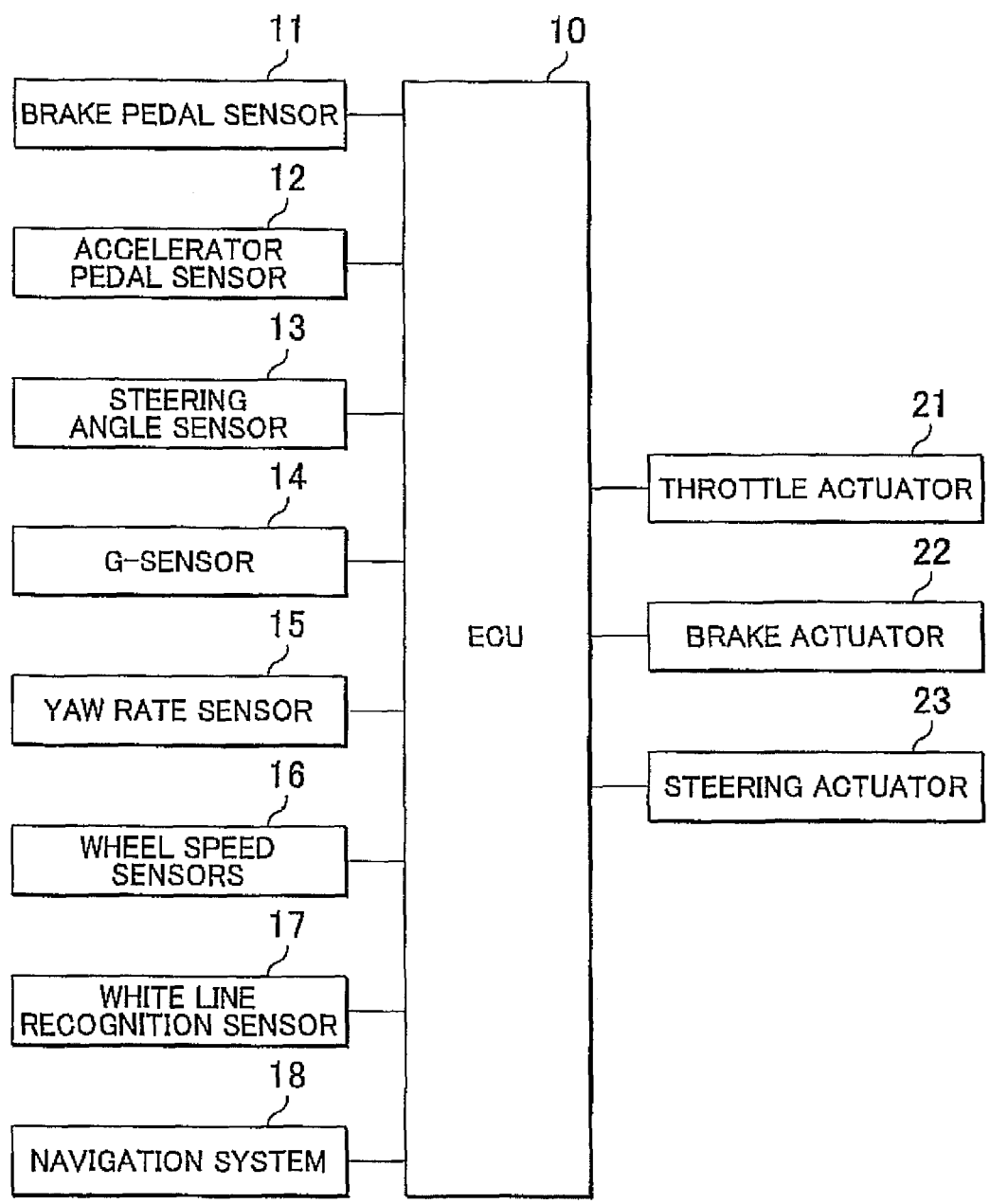
FIG. 1 is a general construction diagram representing a vehicle travel control apparatus in accordance with a first embodiment of the invention.
Figure 2:
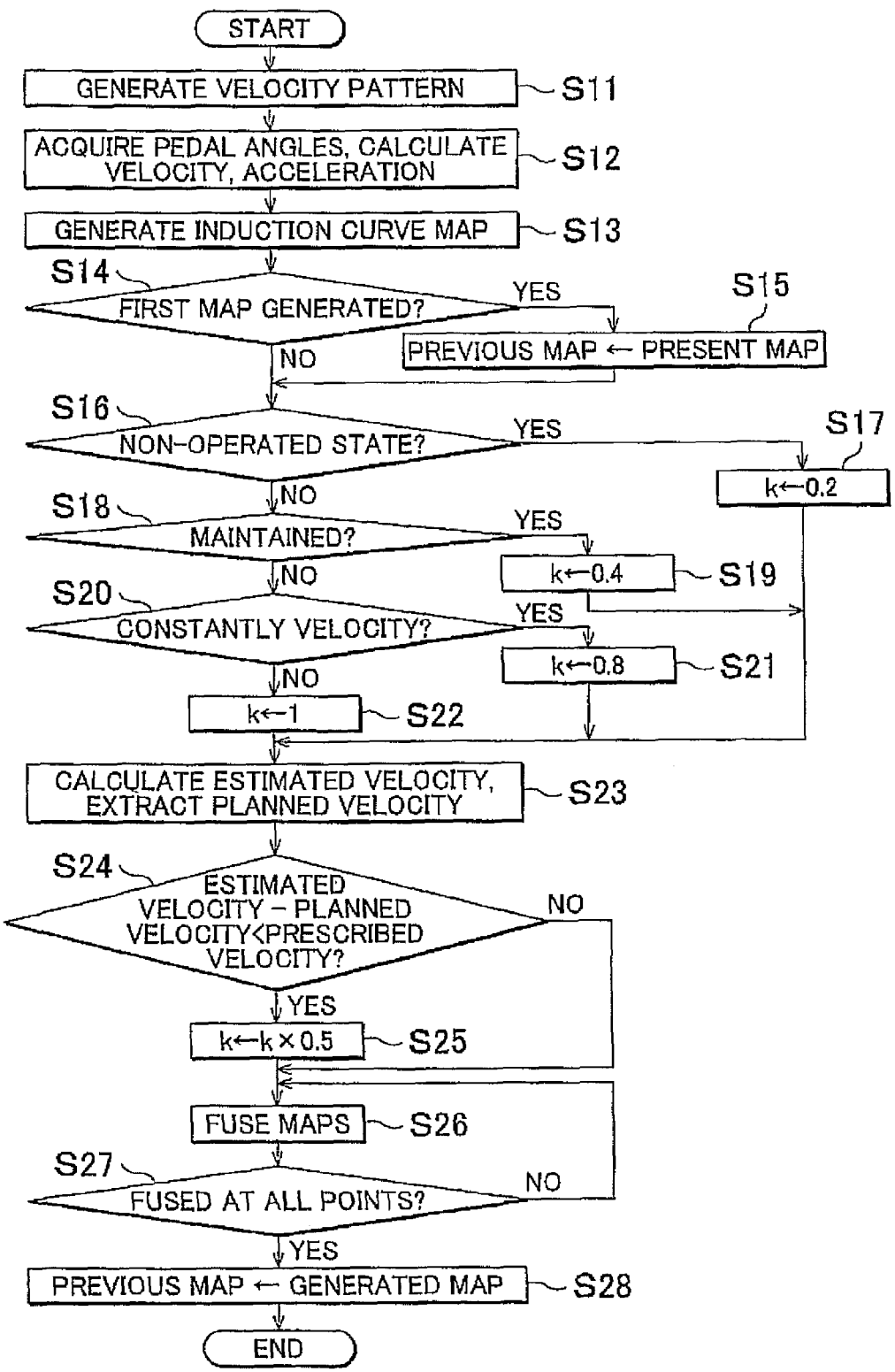
FIG. 2 is a flowchart for generating an acceleration/deceleration-correspondent map in the vehicle travel control apparatus of the first embodiment.
Figure 3:
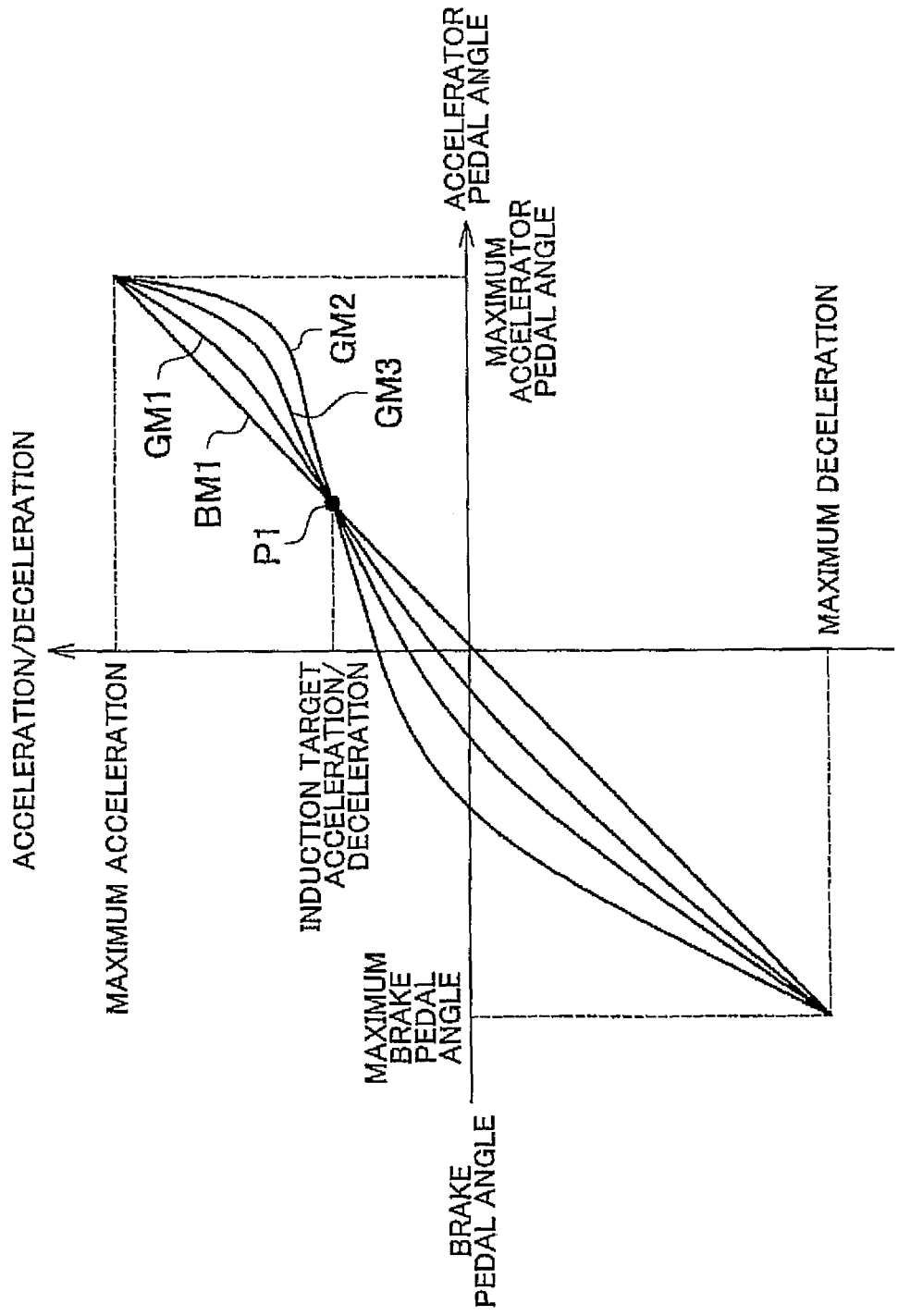
FIG. 3 is a graph representing the acceleration/deceleration-correspondent map used in the vehicle travel control apparatus of the first embodiment.

FIG. 1 is a general construction diagram representing a vehicle travel control apparatus in accordance with a first embodiment of the invention. FIG. 2 is a flowchart for generating an acceleration/deceleration-correspondent map in the vehicle travel control apparatus of the first embodiment. FIG. 3 is a graph representing the acceleration/deceleration-correspondent map used in the vehicle travel control apparatus of the first embodiment.

In the vehicle travel control apparatus of the first embodiment, as shown in FIG. 1, an electronic control unit (ECU) 10 is connected to a brake pedal sensor 11, an accelerator pedal sensor 12, a steering angle sensor 13, a G (acceleration)-sensor 14, a yaw rate sensor 15, wheel speed sensors 16, a white line recognition sensor 17, and a navigation system 18.

The brake pedal sensor 11 detects the amount of depression of a brake pedal that is depressed by a driver of a vehicle (i.e., the brake pedal stroke or depression force), and outputs the detected amount of depression of the brake pedal to the ECU 10. The accelerator pedal sensor 12 detects the amount of depression of an accelerator pedal that is depressed by the driver (i.e., the accelerator operation amount), and outputs the detected amount of depression of the accelerator pedal to the ECU 10. The steering angle sensor 13 detects the steering angle of the steering handle (wheel) that is operated by the driver, and outputs the detected steering angle to the ECU 10.

The G (acceleration)-sensor 14 detects the longitudinal acceleration and the lateral acceleration that act on the vehicle, and outputs the detected accelerations to the ECU 10. The yaw rate sensor 15 detects the yaw rate (lateral turning speed), and outputs the detected yaw rate to the ECU 10. The wheel speed sensors 16 are provided for each of four wheels of the vehicle. Each sensor detects the rotation speed of a corresponding one of the wheels, and outputs the detected rotation speed of the wheel to the ECU 10. The ECU 10 calculates the vehicle speed on the basis of the rotation speeds of the wheels.

The white line recognition sensor 17 has a camera and an image processing device, and detects white lines on the left and right sides of a vehicle-cruising lane, and outputs the detected positions (coordinates) of the left and right white lines to the ECU 10. From the positions of the left and right white lines, the ECU 10 calculates a line that passes through the center of the vehicle (a vehicle central line), the radius of curvature of the vehicle center line, and the like. The navigation system 18 performs detection of the present position of the vehicle, the route guidance to a destination, etc. In particular, this navigation system 18 reads from a map database the configuration of the road on which the vehicle is presently traveling, and outputs the road configuration information to the ECU 10.

The ECU 10 is also connected to a throttle actuator 21, a brake actuator 22, and a steering actuator 23.

The throttle actuator 21 opens and closes a throttle valve of an electronic throttle device, and adjusts the degree of throttle opening of the throttle valve. The ECU 10 operates the throttle actuator 21 so as to adjust the degree of opening of the throttle valve according to an engine control signal. The brake actuator 22 adjusts the control hydraulic pressure to a wheel cylinder that is provided in a brake device. The ECU 10 operates the brake actuator 22 so as to adjust the brake hydraulic pressure of the wheel cylinder according to a brake control signal. The steering actuator 23 gives as a steering torque a rotation drive force provided by an electric motor to a steering mechanism via a speed reduction mechanism. The ECU 10 operates the steering actuator 23 so as to adjust the steering torque via the electric motor according to a steering control signal.

By the way, when the driving or traveling of a vehicle is assisted so that the vehicle travels along a road that has a certain configuration, a target travel route and a velocity pattern are set by taking into account fuel economy, passage time, safety, etc., according to the road configuration. In this case, the target travel route is a travel route along which the vehicle is about to travel. This target travel route includes many parameters that are needed for the traveling of the vehicle, such as the position of the vehicle, the vehicle speed, the acceleration, the yaw rate, etc.

In this case, the ECU 10 sets induction target acting forces (induction target acceleration/deceleration, or induction target lateral force) that are caused to act on the vehicle in order to induce the traveling state of the vehicle into a predetermined state at every interval of a time during which the traveling state of the vehicle changes, and adjusts the forces that are presently acting on the vehicle, concretely, the acceleration and deceleration in the longitudinal direction of the vehicle, and the lateral force (steering handle's angular speed), by controlling the throttle actuator 21, the brake actuator 22 and the steering actuator 23 so that the traveling state of the vehicle has the set induction target acting forces.

The vehicle travel control apparatus of the first embodiment controls the traveling of the vehicle by adjusting the longitudinal acceleration/deceleration that acts on the vehicle. The vehicle travel control apparatus includes: an acceleration/deceleration adjustment portion (acting force adjustment portion) that adjusts the acceleration and deceleration of the vehicle (acting force) according to the state of travel of the vehicle; an operating state detection portion that detects an operating state of an operation member that the driver of the vehicle operates for controlling the state of travel of the vehicle; and an adjustment degree alteration portion that alters the degree of the adjustment made by the acceleration/deceleration adjustment portion, according to the operating state of the operation member.

Specifically, the adjustment degree alteration portion alters the degree of the adjustment by the acceleration/deceleration adjustment portion according to the operation change amount (the amount of change in the amount of operation) that is the amount of change regarding an operation member which occurs when the operation member is operated. The degree of the adjustment made by the acceleration/deceleration adjustment portion is altered to a degree that is greater the greater the operation change amount of the operation member.

Concretely, in the vehicle travel control apparatus of the first embodiment, the acceleration/deceleration adjustment portion has a basic map in which the target acceleration/deceleration (target acting force) is set according to the amount of operation of the operation member. When the induction target acceleration/deceleration (induction target acting force) is set according to the state of travel of the vehicle, the acceleration/deceleration adjustment portion generates an induction map by correcting the basic map so that the amount of change in the acceleration/deceleration (acting force) according to the operation change amount of the operation member becomes small in a predetermined range that contains the amount of operation of the operation member that corresponds to the induction target acceleration/deceleration.

In this case, the acceleration/deceleration adjustment portion is able to alter the induction map according to the state of travel of the vehicle, and the adjustment degree alteration portion alters the proportion of fusion between the previous induction map that is used on the previous occasion and the present induction map that is newer than the previous induction map according to the operating state of the operation member.

Incidentally, the foregoing operation member includes the accelerator pedal, the brake pedal, or the steering handle. Besides, the acceleration/deceleration adjustment portion includes the throttle actuator 21, the brake actuator 22, and the steering actuator 23. The operating state detection portion includes the brake pedal sensor 11, the accelerator pedal sensor 12, and the steering angle sensor 13. The adjustment degree alteration portion is functionally realized by the ECU 10, and executes various processes.

The vehicle travel control apparatus of the first embodiment will be concretely described. The vehicle travel control apparatus of the first embodiment, through the use of the navigation system 18, reads from the map database the road configuration of a route along which the vehicle is about to travel, and sets a target travel route, and generates a velocity pattern commensurate with the target travel route. Then, the vehicle travel control apparatus sets an induction target acceleration/deceleration on the basis of the generated velocity pattern, or the presence/absence of a preceding vehicle in front of the host vehicle or a succeeding vehicle behind the host vehicle which is detected by forward and rearward laser devices that are mounted on the host vehicle and, if such a vehicle is present, the distance from the host vehicle to the preceding or succeeding vehicle. Using this induction target acceleration/deceleration, the apparatus generates an acceleration/deceleration-correspondent map (induction map). Then, on the basis of the velocity pattern and the acceleration/deceleration-correspondent map, the vehicle travel control apparatus drives the throttle actuator 21, the brake actuator 22 and the steering actuator 23 to control the traveling of the vehicle so that the present acceleration/deceleration becomes equal to the target acceleration/deceleration.

Concretely, the vehicle travel control apparatus firstly generates a basic map BM1 for setting a target acceleration/deceleration that corresponds to the accelerator pedal angle and the brake pedal angle, as shown in FIG. 3. In the diagram of FIG. 3, the horizontal axis represents the amount of operation of the accelerator pedal (the accelerator pedal angle) and the amount of operation of the brake pedal (the brake pedal angle), and the vertical axis represents the acceleration/deceleration of the vehicle (the acceleration on the positive side, and the deceleration on the negative side). Incidentally, in the following description, the amount of depression of the accelerator pedal caused by the driver, that is, the amount of operation of the accelerator pedal (the accelerator operation amount), is termed the accelerator pedal angle, and the amount of depression of the brake pedal caused by the driver, that is, the amount of operation of the brake pedal (the brake pedal stroke, or the depression force), is termed the brake pedal angle. In this basic map BM1, as the amount of operation changes from the maximum brake pedal angle to the maximum accelerator pedal angle, the acceleration/deceleration changes from the maximum deceleration to the maximum acceleration through 0, uniformly at a gradient angle of 45 degrees.

Next, after the induction target acceleration/deceleration is set on the basis of the state of operation of the vehicle, the vehicle travel control apparatus finds the intersection point P1 of the basic map BM1 and the induction target acceleration/deceleration. Then, from the basic map BM1, an acceleration/deceleration-correspondent map GM1 that passes through the intersection point P1 is generated such that in the vicinity of the induction target acceleration/deceleration, the amount of change in the acceleration/deceleration decreases relative to the amount of change in the amount of operation (the accelerator pedal angle or the brake pedal angle). That is, in the acceleration/deceleration-correspondent map GM1, as the amount of operation changes from the maximum brake pedal angle to the maximum accelerator pedal angle, the amount of change in the acceleration/deceleration varies at any point from the maximum deceleration to the maximum acceleration through the intersection point P1. Concretely, the gradient angle of the acceleration/deceleration-correspondent map GM1 at the intersection point P1 is larger than 0 degree and smaller than 45 degrees. In a range of the amount of operation that is smaller than the amount that corresponds to the intersection point P1, the acceleration/deceleration-correspondent map GM1 is positioned above the basic map BM1, whereas in a range of the amount of operation larger than the amount that corresponds to the intersection point P1, the acceleration/deceleration-correspondent map GM1 is below the basic map BM1.

On this acceleration/deceleration-correspondent map GM1, the acceleration/deceleration changes less conspicuously relative to changes in the amount of operation (the accelerator pedal angle or the brake pedal angle) in the vicinity of the induction target acceleration/deceleration. In particular, the closer to zero the gradient angle of the acceleration/deceleration-correspondent map GM1 at the intersection point P1, the smaller the amount of change in the acceleration/deceleration relative to the amount of change in the amount of operation (the accelerator pedal angle or the brake pedal angle). Therefore, in the vicinity of the induction target acceleration/deceleration, it becomes easier to maintain the acceleration at this induction target acceleration/deceleration, so that the target acceleration/deceleration can easily be maintained even through the driver's operation of the accelerator pedal or the brake pedal.

After the acceleration/deceleration-correspondent map GM1 is generated in the foregoing manner, the ECU 10 acquires the amount of depression of the brake pedal (the brake pedal angle) from the brake pedal sensor 11, and the amount of depression of the accelerator pedal (the accelerator pedal angle) from the accelerator pedal sensor 12, and extracts an acceleration/deceleration from the acceleration/deceleration-correspondent map GM1 on the basis of the brake pedal angle or the accelerator pedal angle, and sets the extracted acceleration/deceleration as a target acceleration/deceleration. On another hand, the ECU 10 acquires the rotation speeds of the wheels from the wheel speed sensors 16, and calculates a vehicle speed from the rotation speeds of the wheels, and further calculates the actual acceleration/deceleration of the vehicle. Then, the ECU 10 compares the target acceleration/deceleration and the actual acceleration/deceleration, and controls the throttle actuator 21, the brake actuator 22 and the steering actuator 23 so that the difference between the target and actual values decreases.

In the foregoing vehicle travel control method, the acceleration/deceleration-correspondent map GM1 is generated from the basic map BM1 according to the state of travel of the vehicle, and the acceleration/deceleration-correspondent map GM1 is altered according to changes in the state of travel of the vehicle in order to control the travel of the vehicle. Therefore, when the acceleration/deceleration-correspondent map GM1 is altered, the driver is likely to feel discomfort.

Therefore, in the first embodiment, the acceleration/deceleration-correspondent map GM1 is altered when the amount of change in the operation of the accelerator pedal or the brake pedal caused by the driver is small. That is, the timing of altering the amount of change in the acceleration/deceleration relative to the amount of operation is set according to the state of no operation of the accelerator pedal or the brake pedal performed by the driver, the state of maintenance of a constant amount of pedal operation by the driver, the state of the driver's pedal operation with a constant amount of change, and the state of the driver's pedal operation with variable amounts of change.

Concretely, when the accelerator pedal operation, the brake pedal operation and the steering handle operation are steady, the driver is relatively sensitive to changes in the vehicle velocity or changes in the steering angle, and therefore the intervention by the driving assist performed by the ECU 10 is reduced. On the other hand, when the accelerator pedal operation, the brake pedal operation and the steering handle operation are frequently performed, the driver is relatively insensitive to changes in the vehicle velocity and changes in the steering angle, and therefore the intervention by the drive assist performed by the ECU 10 is increased. In this case, when the accelerator pedal operation, the brake pedal operation and the steering handle operation are steady, it is often the case that the driving of the vehicle performed by the driver is ideal, and therefore both minimization of the discomfort caused by the intervention by the vehicle driving assist and induction to an ideal state of driving can be achieved.

That is, the induction and the intervention are performed according to the degrees of change in the amounts of operation of the accelerator pedal, the brake pedal and the steering wheel, and in the speeds of change in the operation thereof, and in the accelerations of change in the operation thereof. In this embodiment, the state of the vehicle that changes moment by moment is taken into account to achieve both minimization of the discomfort caused by intervention by the vehicle driving assist, and minimization of the control error.

Herein, a process of generating the acceleration/deceleration-correspondent map in the vehicle travel control apparatus of the first embodiment will be described in detail with reference to the flowchart of FIG. 2.

In the generation process for the acceleration/deceleration-correspondent map in the vehicle travel control apparatus of the first embodiment, as shown in FIG. 2, the vehicle travel control apparatus reads the road configuration of a course along which the vehicle is about to travel, from the map database via the navigation system 18, and sets a target travel route, and generates a velocity pattern commensurate with the set target travel route, in step S11.

In step S12, the vehicle travel control apparatus acquires the brake pedal angle detected by the brake pedal sensor 11, and the accelerator pedal angle detected by the accelerator pedal sensor 12. Then, in step S12, the vehicle travel control apparatus calculates the brake pedal angular speed and the accelerator pedal angular speed through temporal differentiation of the acquired brake pedal angle and the acquired accelerator pedal angle, and calculates the brake pedal angle acceleration and the accelerator pedal angle acceleration through further temporal differentiation of the brake pedal angular speed and the accelerator pedal angular speed.

Then, in step S13, the control apparatus generates a basic map BM1 for setting the target acceleration/deceleration of the vehicle corresponding to the accelerator pedal angle and the brake pedal angle as shown in FIG. 3. In this basic map BM1, the acceleration/deceleration changes uniformly at a gradient angle of 45 degrees from the maximum deceleration to the maximum acceleration through zero as the amount of operation changes from the maximum brake pedal angle to the maximum accelerator pedal angle. Then, on the basis of the state of operation of the vehicle, the vehicle travel control apparatus sets the induction target acceleration/deceleration, and finds the intersection point P1 of the basic map BM1 and the induction target acceleration/deceleration, and generates from the basis map BM1 an acceleration/deceleration-correspondent map GM1 passing through the intersection point P1, in such a manner that in the vicinity of the induction target acceleration/deceleration, the amount of change in the acceleration/deceleration is lessened relative to the amount of change in the accelerator pedal angle and the brake pedal angle.

Referring back to FIG. 2, in step S14, the vehicle travel control apparatus determines whether or not the acceleration/deceleration-correspondent map GM1 generated in step S13 is the first one to have been generated following the start of the travel of the vehicle. If it is determined that the acceleration/deceleration-correspondent map GM1 generated in step S13 is the first one, the present acceleration/deceleration-correspondent map GM1 is stored as a previous acceleration/deceleration-correspondent map GM1 in step S15, and the process proceeds to step S16. On the other hand, if it is determined that the acceleration/deceleration-correspondent map GM1 generated in step S13 is not the first one, the process proceeds immediately to step S16.

In step S16, it is determined whether or not the brake pedal and the accelerator pedal are in a non-operated state. In this case, it is determined whether or not the brake pedal angle detected by the brake pedal sensor 11 and the accelerator pedal angle detected by the accelerator pedal sensor 12 are both zero. If it is determined that both pedals are in the non-operated state, that is, a pedal non-operated state is present, it means that the driver is most sensitive to changes in the behavior of the vehicle, and a map fusion coefficient k is set at a very small value, for example, 0.2, in step S17. After that, the process proceeds to step S23. On the other hand, if it is determined that the pedal non-operated state is not present, it is then determined in step S18 whether or not the brake pedal and the accelerator pedal are each in a state where a constant amount of operation is maintained. In this case, it is determined whether or not the brake pedal angular speed and the accelerator pedal angular speed are zero.

If it is determined in step S18 that the pedals are in the state of maintenance of constant amount of operation, it means that the driver is relatively sensitive to changes in the behavior of the vehicle, and therefore the map fusion coefficient k is set at a small value, for example, 0.4, in step S19. After that, the process proceeds to step S23. On the other hand, if it is determined in step S18 that the pedal state in which constant amount of operation is maintained is not present, it is then determined in step S20 whether or not the brake pedal and the accelerator pedal are each being operated with a constant amount of change. In this case, it is determined whether or not both the brake pedal angle acceleration and the accelerator pedal angle acceleration are zero. If it is determined that the pedals are in the state of being operated with constant amount of change, it means that the driver is performing a smooth driving, and therefore the map fusion coefficient k is set at a slightly reduced value, for example, 0.8, in step S21. After that, the process proceeds to step S23. On the other hand, it is determined that the pedal state of being operated with constant amount of change is not present, it means that the driver is performing an operation with a great change, and therefore cannot sensitively perceive changes. Therefore, in step S22, the map fusion coefficient k is set at a large value, for example, 1.0. After that, the process proceeds to step S23.

In step S23, an estimated velocity of the vehicle that is estimated to occur at a predetermined time (e.g., 100 ms) from the present time if the present acceleration is continued from the present velocity of the vehicle is calculated by using the following expression (1).

$$\text{Estimated velocity} = \text{present velocity} + \text{present acceleration} \times 100 \text{ ms} \quad (1)$$

Besides, a planned velocity at a predetermined time (e.g., 100 ms) from the present time is extracted from the velocity pattern generated in step S11.

Then, in step S24, it is determined whether or not a deviation (difference) between the estimated velocity calculated in step S23 and the planned velocity is smaller than a prescribed velocity $V_0$ (e.g., 3 km/h) that is set beforehand. If it is determined that the deviation between the estimated velocity and the planned velocity is smaller than the prescribed velocity $V_0$, it means that there is no need for induction, and therefore in step S25 the map fusion coefficient k is set at a small value, for example, a value obtained by multiplying the value k set in the foregoing step by 0.5. After that, the process proceeds to step S26. On the other hand, if it is determined that the deviation between the estimated velocity and the planned velocity is greater than or equal to the prescribed velocity $V_0$, the process proceeds immediately to step S26.

In step S26, the previous acceleration/deceleration-correspondent map GM1 and the present acceleration/deceleration-correspondent map GM2 are fused according to the set map fusion coefficient k. In this case, a fused acceleration/deceleration-correspondent map GM3 is generated by fusing points (points in coordinates) GM1n and GM2n on the previous and present acceleration/deceleration-correspondent maps GM1 and GM2 by using the following expression (2).

$$GM3n = k \times GM2n + (1-k) \times GM1n \quad (2)$$

That is, the acceleration/deceleration-correspondent map GM3 is generated by fusing the previous acceleration/deceleration-correspondent map GM1 and the present acceleration/deceleration-correspondent map GM2 as shown in FIG. 3.

If at this time, the map fusion coefficient k is small, the influence of the present acceleration/deceleration-correspondent map GM2 becomes small, so that the amount of alteration of the induction operation (i.e., acceleration/deceleration) is small, and the occurrence of discomfort to the driver is low. On the other hand, if the map fusion coefficient k is large, the influence of the present acceleration/deceleration-correspondent map GM2 becomes large, and therefore the amount of alteration of the induction operation (i.e., acceleration/deceleration) is large. However, since the operation state is such that the driver may not sensitively perceive changes, the occurrence of discomfort to the driver is low.

In step S27, it is determined whether or not the fusion between the previous and present acceleration/deceleration-correspondent maps GM1 and GM2 has been completed at all points GM2n and GM1n on the maps. If it is determined that the fusion has been completed at all points GM2n and GM1n, it means that a new acceleration/deceleration-correspondent map GM3 has been generated. Therefore, in step S28, the presently generated acceleration/deceleration-correspondent map GM3 is stored as a previous acceleration/deceleration-correspondent map GM1.

By repeatedly performing the foregoing process of steps S11 to S28, the acceleration/deceleration-correspondent map GM1 can be altered according to the state of travel of the vehicle, and the degree of the alteration, that is, the amount of intervention by the induction, can be altered.

Thus, the vehicle travel control apparatus of the first embodiment is provided with: the acceleration/deceleration adjustment portion which is constructed so as to be able to control the travel of the vehicle by adjusting the acceleration and the deceleration that acts on the vehicle, and which adjusts the acceleration and the deceleration according to the state of travel of the vehicle; the operating state detection portion that detects the operating state of operation members (the brake pedal, and the accelerator pedal) that the driver uses to operate the traveling of the vehicle; and an adjustment degree alteration portion that alters the degree of the adjustment made by the acceleration/deceleration adjustment portion, according to the operating state of the operation members.

That is, the acceleration/deceleration adjustment portion adjusts the acceleration and the deceleration of the vehicle according to the state of travel of the vehicle, and the adjustment degree alteration portion alters the degree of the adjustment according to the operating state of the operation member. Therefore, the burden on the driver may be lessened by performing a proper travel assist, and the drivability may be improved by performing an assist with less discomfort caused to the driver or the like.

Besides, in the vehicle travel control apparatus of the first embodiment, the adjustment degree alteration portion alters the degree of the adjustment made by the acceleration/deceleration adjustment portion, according to the operation change amount of the operation member. In this case, the adjustment degree alteration portion alters the degree of the adjustment made by the acceleration/deceleration adjustment portion to a degree that is greater the greater the operation change amount of the operation member. That is, when the operation state is a sensitive state in which the driver does not vigorously operate the operation members, the degree of adjustment of the acceleration and deceleration is decreased. When the operation state is an insensitive state in which the driver operates the operation member to a great extent and is therefore insensitive to changes, the degree of adjustment of the acceleration and deceleration is increased. Hence, the occurrence of discomfort to the driver can be restrained, and the drivability can be improved.

Besides, in the vehicle travel control apparatus of the first embodiment, the acceleration/deceleration adjustment portion sets a basic map in which the target acceleration/deceleration is set according to the amount of operation of the operation member. When a induction target acceleration/deceleration is set according to the state of travel of the vehicle, the acceleration/deceleration adjustment portion generates an acceleration/deceleration-correspondent map (induction map) by correcting the basic map so that the amount of change in the acceleration/deceleration commensurate with the operation change amount of the operation member is small in a predetermined range that contains the amount of operation of the operation member which corresponds to the induction target acceleration/deceleration. Hence, the travel control of the vehicle can easily be performed by altering the acceleration/deceleration-correspondent map according to the state of travel of the vehicle.

Besides, in the vehicle travel control apparatus of the first embodiment, the acceleration/deceleration adjustment portion is able to alter the acceleration/deceleration-correspondent map according to the state of travel of the vehicle, and the adjustment degree alteration portion alters the fusion proportion between the previous induction map and the present induction map according to the operating state of the operation member. Hence, by altering the map fusion proportion according to the operating state of the operation member, it is possible to perform a vehicle driving assist with reduced discomfort to the driver.

Figure 4:
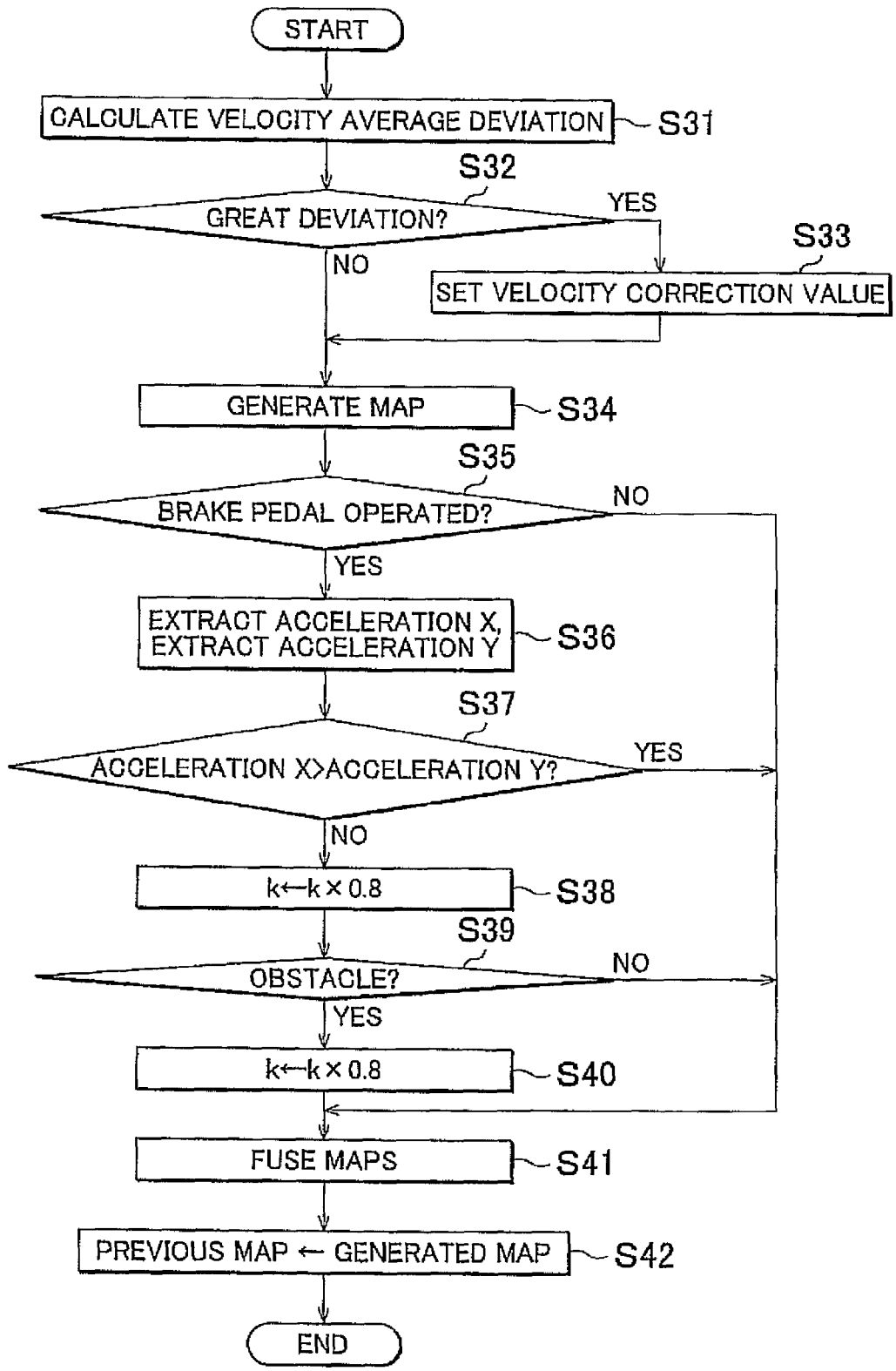
FIG. 4 is a flowchart for generating an acceleration/deceleration-correspondent map in a vehicle travel control apparatus in accordance with a second embodiment of the invention.

FIG. 4 is a flowchart for generating an acceleration/deceleration-correspondent map in a vehicle travel control apparatus in accordance with a second embodiment of the invention. The overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be described again below.

In the vehicle travel control apparatus of the second embodiment, when the operation member is the brake pedal (brake operation member) and the acceleration/deceleration adjustment portion performs adjustment to such a side that the deceleration decreases, the adjustment degree alteration portion reduces the degree of the adjustment of the deceleration made by the acceleration/deceleration adjustment portion.

It is to be noted herein that the vehicle travel control apparatus of the first embodiment generates a velocity pattern and also generates an acceleration/deceleration-correspondent map (induction map), and drives and controls the throttle actuator 21 and the brake actuator 22 so that the present acceleration/deceleration of the vehicle becomes equal to the target acceleration/deceleration. That is, in the vehicle travel control apparatus of the first embodiment, the acceleration based on the amount of operation of the accelerator pedal and the deceleration based on the amount of operation of the brake pedal are handled uniformly as acceleration/deceleration. This is not very suitable to perform a strong induction regarding the deceleration based on the amount of operation of the brake pedal.

In the second embodiment, however, in order to achieve a vehicle driving assist that factors in the travel safety of the vehicle in the brake operation, the vehicle driving assist is performed as usual in the case where alteration is made to such a side that the amount of operation of the brake pedal increases when deceleration is being caused by the driver's operation of the brake pedal, whereas the amount of intervention by the vehicle driving assist, that is, the amount of alteration of the deceleration, is set at small value in the case where alteration is made to such a side that the amount of operation of the brake pedal decreases when deceleration is being caused by the driver's operation of the brake pedal. Besides, in the case where there is a vehicle traveling in front of the host vehicle, or an obstacle ahead thereof, the amount of alteration of the deceleration is set to a further reduced value. Furthermore, in the case where the driver tends to depress the brake pedal excessively for a control plan that is set with the state of travel of the vehicle taken into account, the vehicle velocity is induced to a slightly higher velocity so as to restrain the occurrence of the alteration of the amount of operation of the brake pedal.

A process of generating an acceleration/deceleration-correspondent map in the vehicle travel control apparatus of the second embodiment will be described in detail with reference to the flowchart shown in FIG. 4.

In the process of generating an acceleration/deceleration-correspondent map in the vehicle travel control apparatus of the second embodiment, an average deviation of the actual vehicle speed that changes moment by moment is calculated on the basis of a set velocity pattern in step S31 as shown in FIG. 1 and FIG. 4. In step S32, it is determined whether or not the vehicle speed average deviation calculated in step S31 is greater than a predetermined value (e.g., +5 km/h) that is set beforehand. If it is determined that the vehicle speed average deviation is greater than the predetermined value, a correction value (e.g., +5 km/h) for the velocity pattern is set in step S33, and then the process proceeds to step S34. On the other hand, if in step S32 it is determined that the vehicle speed average deviation is less than or equal to the predetermined value, the process immediately proceeds to step S34.

Then, in step S34, substantially the same process as the foregoing process of steps S11 to S25 in the first embodiment is performed to generate an acceleration/deceleration-correspondent map GM2. In this case, if a correction value for the velocity pattern is set in step S33, this correction is taken into account in generating the acceleration/deceleration-correspondent map GM2. In step S35, it is determined whether or not a brake pedal operation has been performed. In this case, it is determined whether or not the brake pedal angle detected by the brake pedal sensor 11 is greater than 0. If it is determined that no brake pedal operation has been performed, the process proceeds to step S41.

On the other hand, if in step S35 that a brake pedal operation has been performed, an acceleration X that corresponds to the present brake pedal angle on the previous acceleration/deceleration-correspondent map GM1 is extracted in step S36. Besides, an acceleration Y that corresponds to the present brake pedal angle on the present acceleration/deceleration-correspondent map GM2 is extracted. In step S37, it is determined whether or not the acceleration X is greater than the acceleration Y. If it is determined that the acceleration X is greater than the acceleration Y, it means that the acceleration is becoming smaller, that is, the deceleration is becoming greater, and the process proceeds to step S41. On the other hand, if it is determined that the acceleration X is less than or equal to the acceleration Y, it means that the acceleration is becoming greater, that is, the deceleration is becoming smaller, and the map fusion coefficient k is set to a smaller value, for example, the map fusion coefficient k is multiplied by 0.8, in step S38.

Besides, in step S39, it is determined whether or not there is an obstacle (or a preceding vehicle) in front of the host vehicle. If it is determined that there is not an obstacle in front of the host vehicle, the process proceeds to step S41. On the other hand, if it is determined that there is an obstacle in front of the host vehicle, the map fusion coefficient k is updated to a smaller value, for example, to a value obtained by multiplying the map fusion coefficient k by 0.8, in step S40.

In step S41, the previous acceleration/deceleration-correspondent map GM1 and the present acceleration/deceleration-correspondent map GM2 are fused according to the set map fusion coefficient k to generate an acceleration/deceleration-correspondent map GM3. This process is substantially the same as the process of steps S26 and S27 in the first embodiment. Then, in step S42, the presently generated acceleration/deceleration-correspondent map GM3 is stored as a previous acceleration/deceleration-correspondent map GM1.

Thus, in the vehicle travel control apparatus of the second embodiment, when the operation member is the brake pedal and the acceleration/deceleration adjustment portion performs adjustment to such a side that the deceleration decreases, the adjustment degree alteration portion reduces the degree of the adjustment of the deceleration made by the acceleration/deceleration adjustment portion.

That is, the acceleration/deceleration adjustment portion adjusts the acceleration and the deceleration according to the state of travel of the vehicle. When the acceleration/deceleration adjustment portion performs adjustment to the side of decrease of the deceleration, the adjustment degree alteration portion reduces the degree of the adjustment of the deceleration made by the acceleration/deceleration adjustment portion. Therefore, through an optimum vehicle travel assist commensurate with the function characteristic of the brake, the burden on the driver can be lessened, and travel safety can be secured.

Figure 5:
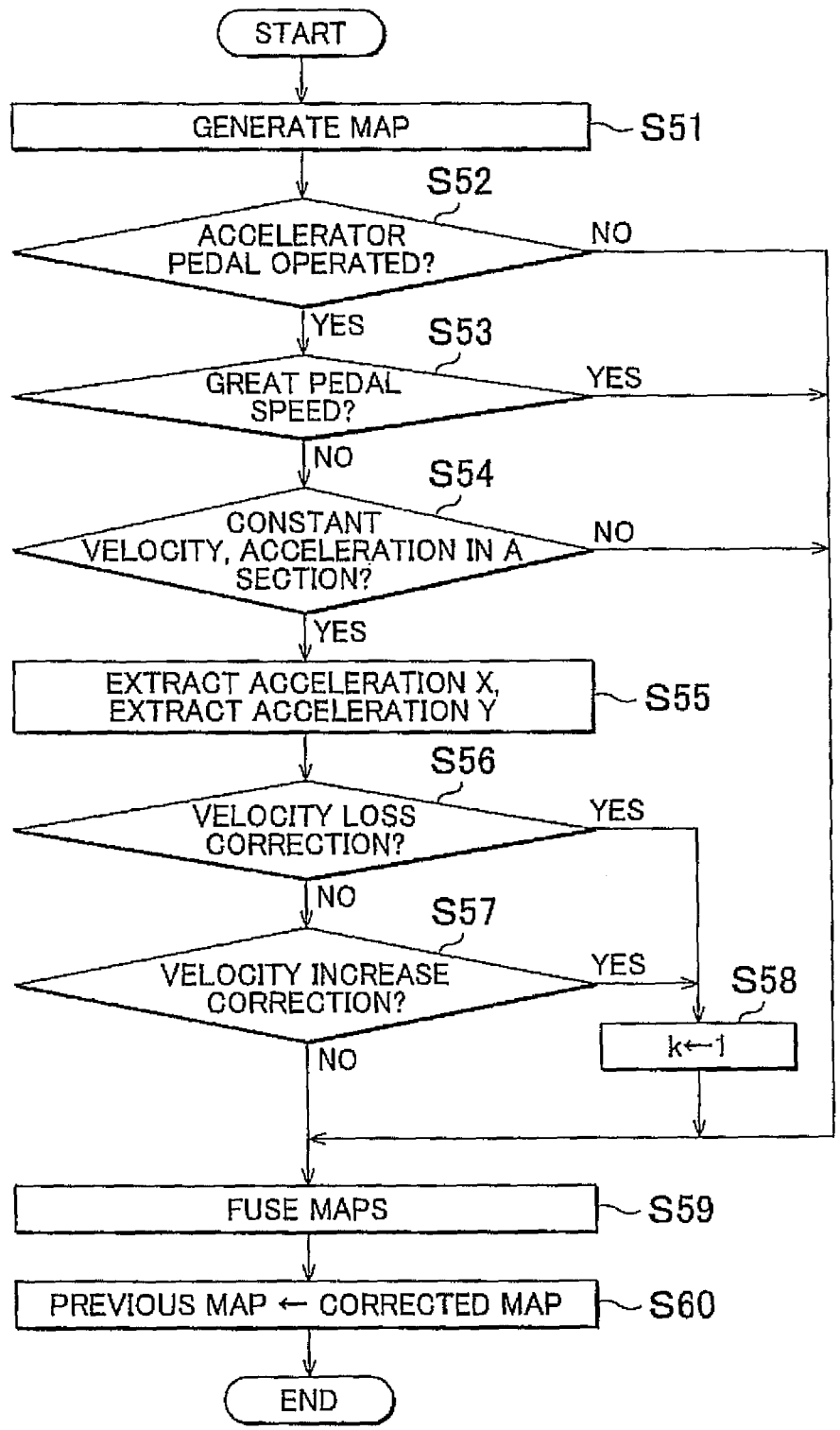
FIG. 5 is a flowchart for generating an acceleration/deceleration-correspondent map in a vehicle travel control apparatus in accordance with a third embodiment of the invention.

FIG. 5 is a flowchart for generating an acceleration/deceleration-correspondent map in a vehicle travel control apparatus in accordance with a third embodiment of the invention. The overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be described again below.

In the vehicle travel control apparatus of the third embodiment, the operation member is the accelerator pedal (accelerator operation member), and when a road has slope in the longitudinal direction of the vehicle, the adjustment degree alteration portion alters the degree of the adjustment of the acceleration made by the acceleration/deceleration adjustment portion, according to the slope of the road.

Besides, when the deviation between the actual velocity of the vehicle and the target velocity thereof is greater than a predetermined value that is set beforehand, the adjustment degree alteration portion increases the degree of the adjustment of the acceleration made by the acceleration/deceleration adjustment portion.

The vehicle travel control apparatus of the third embodiment will be concretely described. That is, the vehicle travel control apparatus of the first embodiment generates a velocity pattern, and generates an acceleration/deceleration-correspondent map (induction map), and drives and controls the throttle actuator 21 and the brake actuator 22 so that the present acceleration/deceleration of the vehicle becomes equal to the target acceleration/deceleration. In other words, in the vehicle travel control apparatus of the first embodiment, the acceleration based on the amount of operation of the accelerator pedal and the deceleration based on the amount of operation of the brake pedal are handled uniformly as acceleration/deceleration. However, when weak induction is performed with regard to the acceleration based on the amount of operation of the accelerator pedal, it sometimes occurs that the driver cannot maintain a steady travel of the vehicle, and feels discomfort, depending on the state of the traveling road of the vehicle.

Therefore, in the third embodiment, as for the accelerator operation, due to a need for a vehicle driving assist that factors in the traveling stability of the vehicle, the amount of intervention by the vehicle driving assist, that is, the amount of alteration of the acceleration, is set such that a steady travel can be maintained when the traveling road has a slope. That, the driver, when expecting a steady travel of the vehicle, is sensitive to the intervention to a side of divergence from the steady travel, but is insensitive to the intervention to a side of maintenance of the steady travel, and the discomfort that the driver feels is small if any. With regard to the driver's accelerator pedal operation, since the frequency of maintaining a steady travel is great, the driver is less likely to feel discomfort the intervention if the intervention is in such a direction that the velocity is maintained relative to changes in the road scope. Therefore, when the amount of depression of the accelerator pedal (accelerator pedal angle) is constant, the amount of alteration of the acceleration/deceleration so as to maintain a steady travel provided that the velocity and the acceleration of the vehicle according to the control plan that factors in the state of travel of the vehicle are planned to be constant.

A process of generating an acceleration/deceleration-correspondent map in the vehicle travel control apparatus of the third embodiment will be described in detail with reference to the flowchart of FIG. 5.

In the generation process for an acceleration/deceleration-correspondent map in the vehicle travel control apparatus of the third embodiment, as shown in FIG. 1 and FIG. 5, in step S51, substantially the same process as the foregoing process of steps S11 to S25 in the first embodiment is performed to generate an acceleration/deceleration-correspondent map GM2. In step S52, it is determined whether or not accelerator pedal operation has been performed. In this case, it is determined whether or not the accelerator pedal angle detected by the accelerator pedal sensor 12 is greater than 0. If it is determined in this step that accelerator pedal operation has not been performed, the process proceeds to step S59.

On the other hand, if it is determined that accelerator pedal operation has been performed, it is then determined in step S53 whether or not the operation speed of the accelerator pedal is greater than or equal to a predetermined speed (e.g., 5 deg/s) that is set beforehand. If it is determined in this step that the operation speed of the accelerator pedal is greater than or equal to the predetermined speed, the vehicle is estimated not to be steadily traveling, and then the process proceeds to step S59. On the other hand, if it is determined that the operation speed of the accelerator pedal is smaller than the predetermined speed, the vehicle is estimated to be steadily traveling, and the process proceeds to step S54.

In step S54, it is determined whether or not the velocity and the acceleration of the vehicle set by the velocity pattern are constant in a certain section of the travel road along which the vehicle is presently traveling. If it is determined in this step that neither the velocity nor the acceleration is constant in the certain section, the process proceeds to step S59. On the other hand, if it is determined that the velocity and the acceleration are constant in the certain section, the process proceeds to step S55.

In step S55, the acceleration X that corresponds to the present accelerator pedal angle that is determined by the previous acceleration/deceleration-correspondent map GM1 is extracted. Besides, the acceleration Y that corresponds to the present accelerator pedal angle that is determined by the present acceleration/deceleration-correspondent map GM2 is extracted. In step S56, it is determined whether or not the present acceleration of the vehicle is negative (the vehicle is losing speed on an uphill) and the acceleration X is smaller than the acceleration Y. If it is determined in this step that the acceleration of the vehicle is negative and the acceleration X is smaller than the acceleration Y, correction for vehicle speed loss is needed, and the map fusion coefficient k is set at 1.0 in step S58.

On the other hand, if it is determined in step S56 that the acceleration of the vehicle is not negative or that the acceleration X is greater than the acceleration Y, the process proceeds to step S57. In step S57, it is determined whether or not the present acceleration of the vehicle is positive (the vehicle is gaining speed on a downhill) and the acceleration X is greater than the acceleration Y. If it is determined in this step that the acceleration of the vehicle is positive and the acceleration X is greater than the acceleration Y, a correction for vehicle speed increase is needed, and the map fusion coefficient k is set at 1.0 in step S58. On the other hand, if in step S57 it is determined that the acceleration of the vehicle is not positive or that the acceleration X is not greater than the acceleration Y, the process proceeds to step S59.

In step S59, the previous acceleration/deceleration-correspondent map GM1 and the present acceleration/deceleration-correspondent map GM2 are fused according to the set map fusion coefficient k to generate an acceleration/deceleration-correspondent map GM3. This process is substantially the same as the foregoing process of steps S26 to S27 in the first embodiment. Then, in step S60, the presently generated acceleration/deceleration-correspondent map GM3 is stored as a previous acceleration/deceleration-correspondent map GM1.

Thus, in the vehicle travel control apparatus of the third embodiment, when the operation member is the accelerator pedal and the road has a slope in the longitudinal direction of the vehicle, the adjustment degree alteration portion reduces the degree of the adjustment of the acceleration made by the acceleration/deceleration adjustment portion, according to the slope of the road.

Thus, the acceleration/deceleration adjustment portion adjusts the acceleration and the deceleration according to the state of travel of the vehicle. When the road has an upslope or downslope, the adjustment degree alteration portion alters the degree of the adjustment of acceleration made by the acceleration/deceleration adjustment portion, according to the slope of the road. Hence, by performing art optimum travel assist commensurate with the function characteristic of the accelerator, the burden on the driver can be lessened, and travel safety can be secured.

Besides, in the vehicle travel control apparatus of the third embodiment, when a deviation between the actual velocity of the vehicle and a target velocity is greater than a predetermined value that is set beforehand, the adjustment degree alteration portion increases the degree of the adjustment of acceleration made by the acceleration/deceleration adjustment portion. Therefore, the velocity of the vehicle can be kept at the target velocity, and the traveling stability can be improved.

Figure 6:
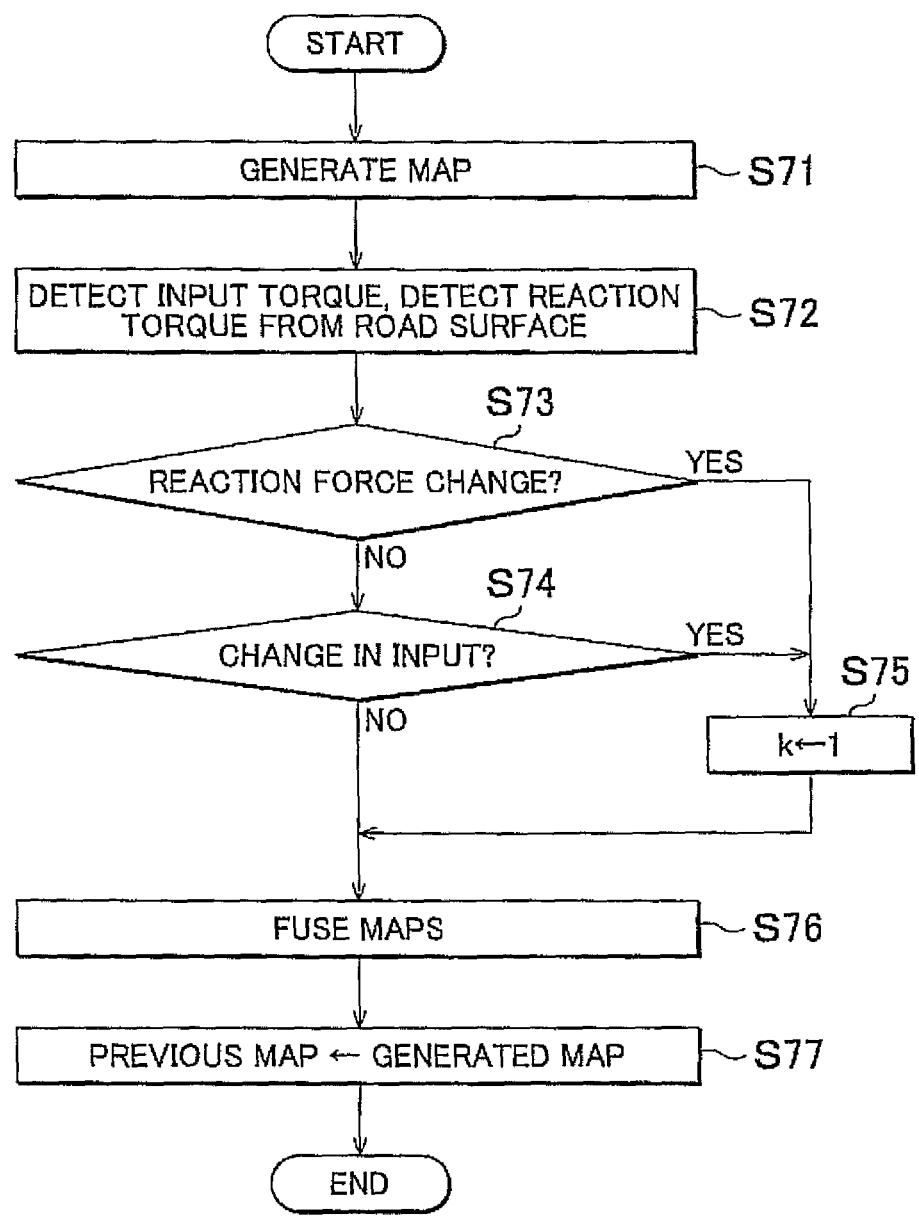
FIG. 6 is a flowchart for generating a steering handle's angular speed-correspondent map in a vehicle travel control apparatus in accordance with a fourth embodiment of the invention.
Figure 7:
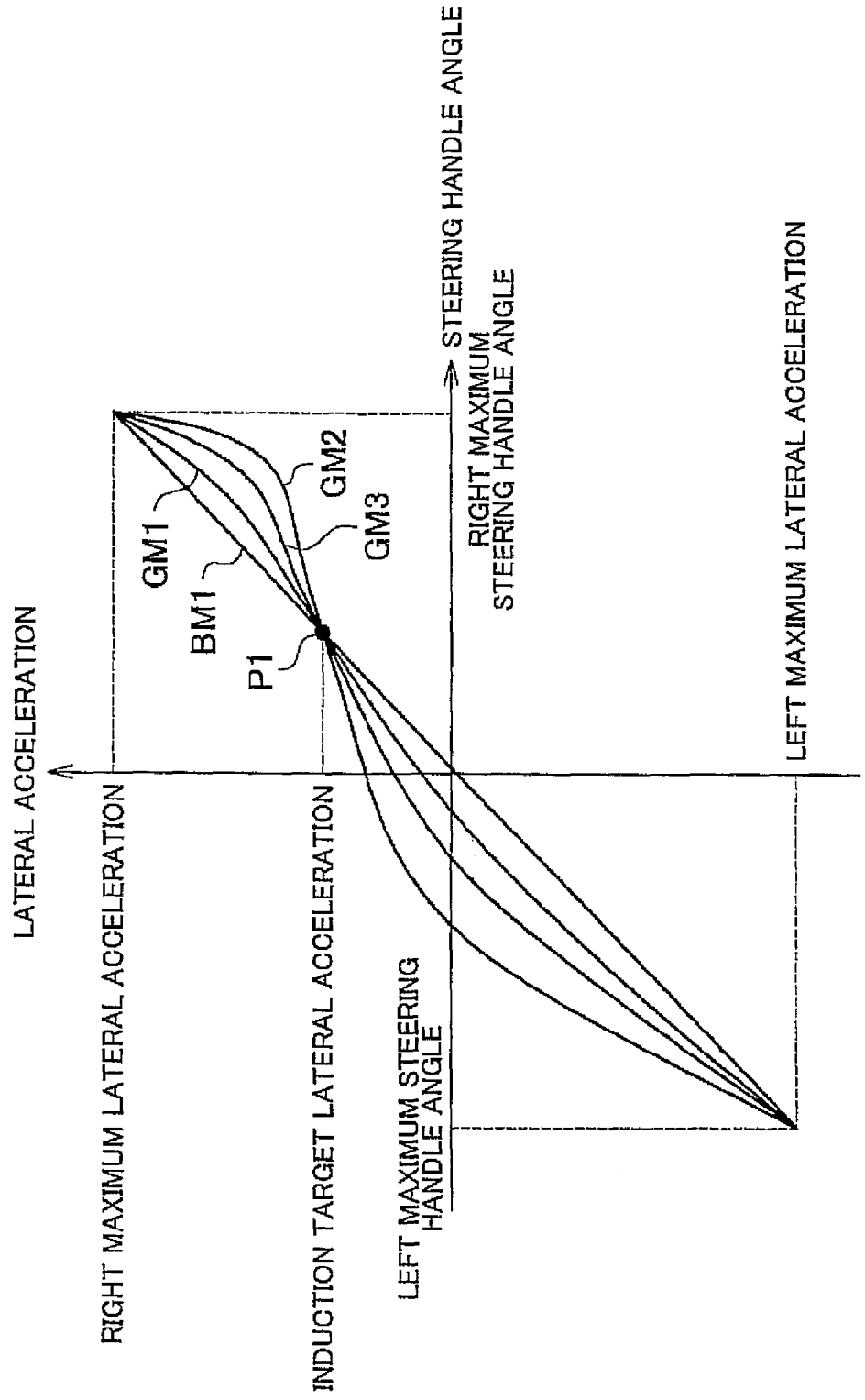
FIG. 7 is a graph representing the steering handle's angular speed-correspondent map used in the vehicle travel control apparatus of the fourth embodiment.

FIG. 6 is a flowchart for generating a lateral acceleration-correspondent map in a vehicle travel control apparatus in accordance with a fourth embodiment of the invention. FIG. 7 is a graph representing a lateral acceleration-correspondent map in the vehicle travel control apparatus of the fourth embodiment. The overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be described again below.

In the vehicle travel control apparatus of the fourth embodiment, the operation member is a steering handle (wheel) (steering handle operation member), and the adjustment degree alteration portion alters the degree of the adjustment of the steering handle angular acceleration made by a lateral acceleration adjustment portion (acting force adjustment portion), according to the input torque caused by the steering handle operation or the reaction torque from the road surface. In this case, the steering handle angular acceleration is a lateral force that acts on the vehicle when the vehicle is steered by using the steering handle, that is, a lateral acceleration.

The vehicle travel control apparatus of the fourth embodiment will be concretely described. The vehicle travel control apparatus of the first embodiment generates a velocity pattern, and generates a lateral acceleration-correspondent map (induction map), and drives and controls the steering actuator 23 so that the present lateral acceleration becomes equal to a target lateral acceleration. That is, in the foregoing vehicle travel control apparatus of the first embodiment, the acceleration/deceleration based on the amount of operation of the brake pedal and the acceleration/deceleration based on the amount of operation of the accelerator pedal are uniformly handled. However, for the traveling of the vehicle, there is a need to take the steering handle characteristic (lateral force that acts on the vehicle) into account.

Therefore, in the fourth embodiment, the torque input and the torque reaction force are taken into account as steering handle characteristics. In this case, the amount of intervention by the vehicle driving assist, that is, the amount of alteration of the lateral acceleration, is set according to changes in the torque input and the torque reaction force as well as the steering handle angle (steering angle), the steering speed, and the lateral acceleration (steering acceleration). That is, it is estimated that torque input is reflected in any steering angle, and if the deviation of a control plan set with the state of travel of the vehicle taken into account can be decreased, the amount of alteration of the lateral acceleration is adjusted to a reduced amount.

A process of generating a lateral acceleration-correspondent map in the vehicle travel control apparatus of the fourth embodiment will be described in detail with reference to the flowchart of FIG. 5.

In the generation process for a lateral acceleration-correspondent map in the vehicle travel control apparatus of the fourth embodiment, in step S71, substantially the same process as the foregoing process of steps S11 to S25 in the first embodiment is performed to generate a lateral acceleration-correspondent map GM2, as shown in FIG. 1, FIG. 6 and FIG. 7. In this case, the control apparatus acquires the steering handle angle detected by the steering angle sensor 13, and differentiate the steering handle angle with respect to time to calculate a steering handle's angular speed, and further differentiate the steering handle's angular speed with respect to time to calculate a steering handle's angular acceleration (lateral acceleration). Then, in the lateral acceleration-correspondent map GM1, the horizontal axis represents the amount of operation of the steering handle to the left and right (the steering handle angle), and the vertical axis represents the steering handle's angular acceleration, that is, the lateral acceleration that acts on the vehicle. When the steering handle angle changes from the left maximum steering handle angle to the right maximum steering handle angle, the lateral acceleration changes from the left maximum lateral acceleration to the right maximum lateral acceleration. In the vicinity of the induction lateral acceleration, a setting is made such that the amount of change in the lateral acceleration is small relative to the amount of change in the amount of operation (steering handle angle).

In step S72, the input torque is acquired via a steering handle input torque sensor that is mounted in a steering mechanism, and similarly, the reaction torque from the roach surface is acquired via a steering handle reaction torque sensor. In step S73, it is determined whether or not the amount of change in the reaction torque is greater than a predetermined value (e.g., 10 N) that is set beforehand. In this case, the torque sensor acquires the reaction torque in a predetermined cycle, and the amount of change in the reaction torque is calculated on the basis of a deviation between the previously detected reaction torque and the presently detected reaction torque. If it is determined that the amount of change in the reaction torque is greater than the predetermined value, it is considered that the driver is not sensitive to induction, and the map fusion coefficient k is set at 1.0 in step S75. On the other hand, if in step S73 it is determined that the amount of change in the reaction torque is less than or equal to the predetermined value, it is considered that the driver is sensitive to induction, and the process proceeds to step S74.

In step S74, it is determined whether or not the amount of change in the input torque is greater than a predetermined value (e.g., 10 N) that is set beforehand. In this case, the torque sensor is acquiring the input torque in a predetermined cycle, and the amount of change in the input torque is calculated on the basis of a deviation between the previously detected input torque and the presently detected input torque. If it is determined that the amount of change in the input torque is greater than a predetermined value, it is considered that the driver is not sensitive to induction, and the map fusion coefficient k is set at 1.0 in step S75. On the other hand, if in step S74 it is determined that the amount of change in the input torque is less than or equal to the predetermined value, it is considered that the driver is sensitive to induction, the process proceeds to step S76.

In step S76, the previous acceleration/deceleration-correspondent map GM1 and the present acceleration/deceleration-correspondent map GM2 are fused according to the set map fusion coefficient k to generate a lateral acceleration-correspondent map GM3. This process is substantially the same as the foregoing process of steps S26 to S27 in the first embodiment. Then, in step S77, the presently generated lateral acceleration-correspondent map GM3 is stored as a previous lateral acceleration-correspondent map GM1.

Thus, in the vehicle travel control apparatus of the fourth embodiment, the operation member is the steering handle, and the adjustment degree alteration portion alters the degree of the adjustment of the steering handle's angular acceleration, that is, the lateral acceleration, made by the steering handle's angular acceleration adjustment portion, according to the input torque caused by operation of the steering handle or the reaction torque from the road surface.

That is, the steering handle's angular acceleration adjustment portion adjusts the steering handle's angular speed according to the state of travel of the vehicle, and the adjustment degree alteration portion alters the degree of the adjustment of the steering handle's angular acceleration made by the steering handle's angular acceleration adjustment portion, according to the input torque caused by the steering handle operation or the reaction torque from the road surface. Hence, by performing an optimum travel assist commensurate with the function characteristic of the steering handle, the burden on the driver can be lessened, and the travel safety can be secured.

As described above, by altering the degree of the adjustment made by the acting force adjustment portion, according to the operating state of the operation member, the vehicle travel control apparatus of the invention lessens the burden on the driver through a proper travel assist, and improves the drivability through an assist with a reduced discomfort. The vehicle travel control apparatus is useful in the application to any vehicle.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A vehicle travel control apparatus that controls state of travel of a vehicle by adjusting force that acts on the vehicle, comprising:
    an acting force adjustment portion that adjusts the force that acts on the vehicle, according to the state of travel of the vehicle;
    an operating state detection portion that detects an operating state of an operation member that is operated to control the state of travel of the vehicle; and
    an adjustment degree alteration portion that alters degree of adjustment made by the acting force adjustment portion, according to the operating state of the operation member;
    wherein the acting force adjustment portion has a basic map in which a target acting force is set according to the amount of operation of the operation member, and when an induction target acting force is set according to the state of travel of the vehicle, an induction map is generated by correcting the basic map so that an amount of change in an acting force that is commensurate with an operation change amount of the operation member reduces in a predetermined range that contains the amount of operation of the operation member that corresponds to the induction target acting force.

2. The vehicle travel control apparatus according to claim 1, wherein the adjustment degree alteration portion alters the degree of the adjustment made by the acting force adjustment portion, according to an operation change amount that is amount of change that occurs with regard to the operation member when the operation member is operated.

3. The vehicle travel control apparatus according to claim 2, wherein the adjustment degree alteration portion alters the degree of the adjustment made by the acting force adjustment portion to a degree that is greater if the operation change amount of the operation member is greater.

4. The vehicle travel control apparatus according to claim 1, wherein:
    the acting force adjustment portion alters the induction map according to the state of travel of the vehicle; and
    the adjustment degree alteration portion alters a proportion of fusion between a previous induction map that is previously used and a present induction map that is newer than the previous induction map according to the operating state of the operation member.

5. The vehicle travel control apparatus according to claim 1, wherein:
    the operation member is a brake operation member;

the acting force adjustment portion adjusts acceleration and deceleration that act on the vehicle; and when the acting force adjustment portion adjusts the deceleration to a decreased side, the adjustment degree alteration portion reduces the degree of the adjustment of the deceleration made by the acting force adjustment portion.

6. The vehicle travel control apparatus according to claim 1, wherein:

the operation member is an accelerator operation member;

the acting force adjustment portion adjusts acceleration and deceleration that act on the vehicle; and when the vehicle is on a slope in a longitudinal direction of the vehicle, the adjustment degree alteration portion alters the degree of the adjustment of the acceleration made by the acting force adjustment portion, according to the slope.

7. The vehicle travel control apparatus according to claim 6, wherein when the vehicle is on a slope in a longitudinal direction of the vehicle, the adjustment degree alteration portion reduces the degree of the adjustment of the acceleration made by the acting force adjustment portion, according to the slope.

8. The vehicle travel control apparatus according to claim 6, wherein when a deviation between an actual velocity of the vehicle and a target velocity of the vehicle is greater than a predetermined value that is set beforehand, the adjustment degree alteration portion increases the degree of the adjustment of the acceleration/deceleration made by the acting force adjustment portion.

9. The vehicle travel control apparatus according to claim 1, wherein;

the operation member is a steering handle operation member;

the acting force adjustment portion adjusts lateral acceleration that acts on the vehicle; and the adjustment degree alteration portion alters the degree of the adjustment of the lateral acceleration made by the acting force adjustment portion, according to at least one of input torque caused by the steering handle operation member and reaction torque from a road surface.

10. A vehicle travel control method that controls state of travel of a vehicle by adjusting force that acts on the vehicle, comprising:

adjusting the force that acts on the vehicle, according to the state of travel of the vehicle;

detecting an operating state of an operation member that is operated to control the state of travel of the vehicle;

altering degree of adjustment of the force that acts on the vehicle, according to the operating state of the operation member; and providing a basic map in which a target acting force is set according to the amount of operation of the operation member, and when an induction target acting force is set according to the state of travel of the vehicle, an induction map is generated by correcting a basic map so that an amount of change in an acting force that is commensurate with the operation change amount of the operation member reduces in a predetermined range that contains the amount of operation of the operation member that corresponds to the induction target acting force.

11. A vehicle travel control apparatus that controls state of travel of a vehicle by adjusting force that acts on the vehicle, comprising:

an acting force adjustment portion that adjusts lateral acceleration that acts on the vehicle, according to the state of travel of the vehicle;

an operating state detection portion that detects an operating state of a steering handle operation member that is operated to control the state of travel of the vehicle; and an adjustment degree alteration portion that alters degree of adjustment of the lateral acceleration made by the acting force adjustment portion, according to at least one of input torque caused by the steering handle operation member and reaction torque from a road surface;

wherein the acting force adjusting portion has a basic map in which a target acting force is set according to the amount of operation of the steering handle operation member, and when an induction target acting force is set according to the state of travel of the vehicle, an induction map is generated by correcting the basic map so that an amount of change in an acting force that is commensurate with an operation change amount of the steering handle operation member reduces in a predetermined range that contains the amount of operation of the steering handle operation member that corresponds to the induction target acting force.

* * * * *